INVENTOR
Robert H. Canfield
BY
ATTORNEY

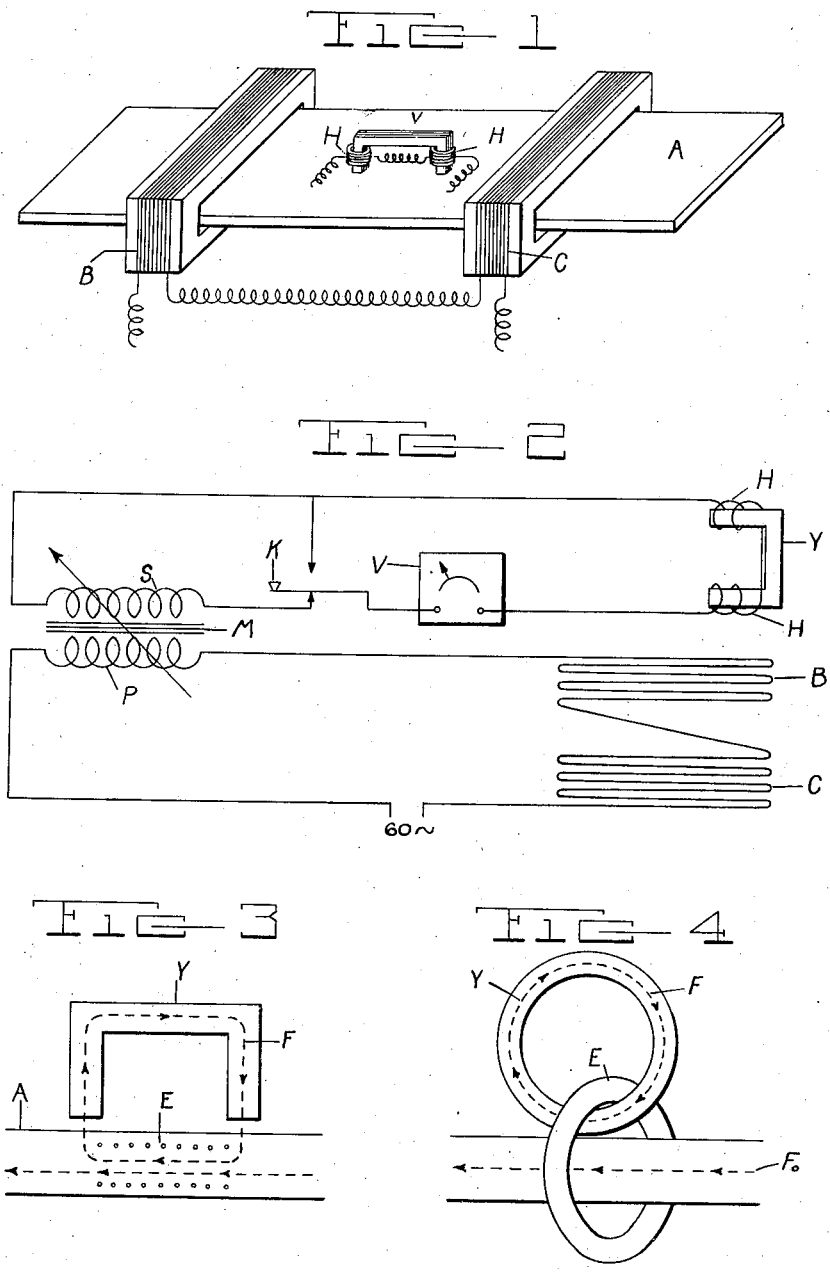

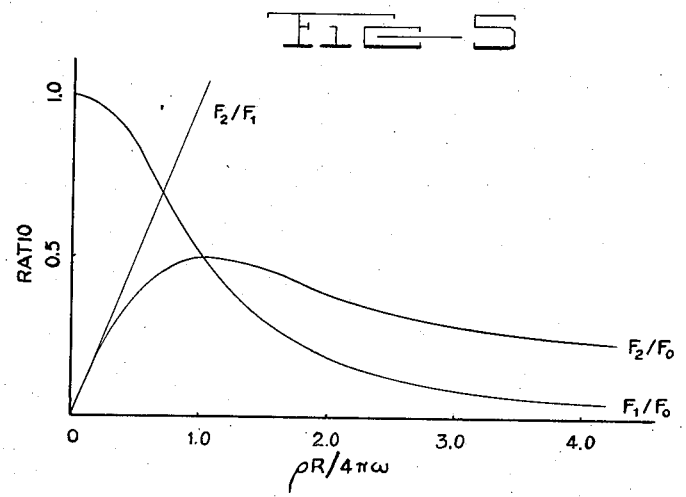
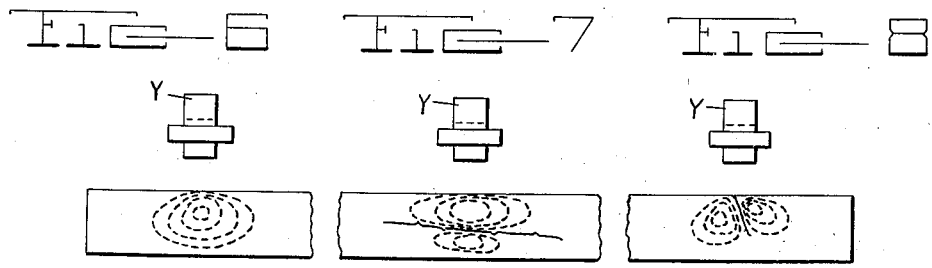
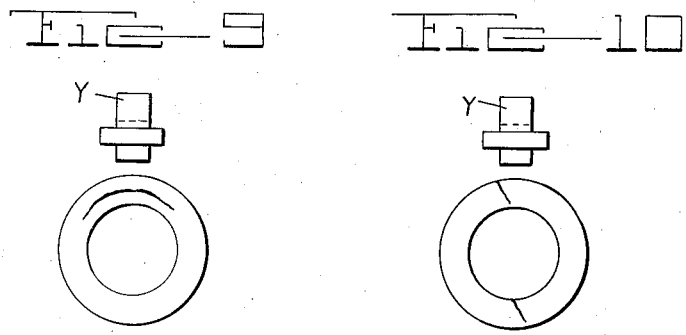

Patented June 17, 1941

2,245,568

UNITED STATES PATENT OFFICE 2,245,568

METHOD OF AND APPARATUS FOR EXAMINING FERROMAGNETIC ARTICLES

Robert H. Canfield, Washington, D. C.

Application January 11, 1939, Serial No. 250,383

12 Claims. (Cl. 175—183)

(Granted under the act of March 3, 1883, as amended April 30, 1928; 370 O. G. 757)

My invention relates to a method of and apparatus for examining articles made of steel or any metal possessing ferromagnetic properties, whereby the existence of hidden cracks or layers of inclusions may be disclosed.

A general description of the method is as follows: The article is placed in an alternating magnetic field of suitable frequency. A magnetic yoke or shunt carrying coils of wire is placed near the surface of the article with its poles in line with the direction of magnetization, leaving a suitable distance (air-gap) between its poles and the surface. Under these conditions an alternating magnetic flux is induced in the yoke, due solely to the coupling produced by the circulation of eddy currents in the portion of the main article which is adjacent to the yoke: these localized eddy currents are in turn only made possible by the presence of the shunt itself. The flux so produced in the yoke is not in phase with the flux in the main article but may be divided into two components—one in phase with the main flux and one in quadrature with it. The coils of wire surrounding the yoke have a voltage induced in them, and the magnitude and phase of this voltage is employed as a measure of the magnitude and phase of the flux in the yoke. It is predicted by theory and verified by experiment that the two components of the flux—i. e., the in-phase and quadrature components—behave very differently towards changes in the eddy currents in the portion of the main article nearby, and to changes in the magnetic reluctance of the path including the yoke itself, the air-gap, and the portion of the main article linked with the yoke by the eddy currents.

In general, it may be said (and will be shown theoretically further on) that a suitable combination of yoke and air-gap may be found such that the quadrature flux will be very sensitive to changes in eddy current resistance and relatively insensitive to changes in permeability of the article being examined. (By suitably altering these conditions, the permeability may be made the critical property.)

This method may be applied to articles of any size and shape which can be magnetized in an alternating field. In general, it becomes less sensitive as the thickness of the article increases; some improvement in this case can be effected by decreasing the frequency. The method is of special advantage in disclosing laminations in steel plates or shapes of relatively broad and thin section. A lamination is a layer of slag or other inclusion which may occur anywhere in a rolled steel article without showing itself at the surface or edges. It is the particular advantage of my method, due to the localized nature of the eddy currents involved, that it can detect and locate laminations where they would escape notice by any method depending on the existence of general eddy currents around the whole section.

Referring now to the drawings:

Fig. 1 is a perspective view of one embodiment of my invention;

Fig. 2 is a schematic diagram of the electrical circuit used in the embodiment of Fig. 1;

Fig. 3 is a diagrammatic showing of the paths of flow of magnetic lines of force through a test specimen and a portion of the apparatus pertaining to the invention;

Fig. 4 is a diagrammatic representation of the independence, except for eddy current coupling, of the magnetic circuits shown in Fig. 3;

Fig. 5 is a graph showing the relation of various electric quantities existing during the use of the apparatus of my invention;

Figs. 6, 7 and 8 are diagrammatic showings of the types of eddy current flow found in the vicinity of flaws of various kinds as well as in a sound portion of a test piece;

Figs. 9 and 10 are sectional views of tubular test pieces showing types of flaws to be expected therein;

Figure 11:
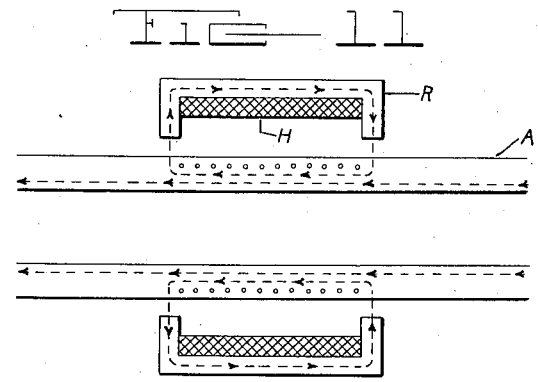
Fig. 11 is a longitudinal sectional view of a length of metal tubing forming a test specimen and the type of apparatus used in testing it.

An exact description of a particular application of my invention follows. In Fig. 1, A is the steel plate under study; B and C are a pair of coils surrounding it, through which passes an alternating current which in this case is of 60 cycle frequency. Y is a magnetic yoke carrying coils H. The poles of the yoke are separated from the plate by an air-gap which in this case is about one inch. The voltage induced in the coils H is measured and analyzed for its phase relations by the circuit shown diagrammatically in Fig. 2. Although only one such yoke and pair of coils are shown, a number of such units may extend across the plate. Likewise, such units may be located beneath the plates.

Here B, C, are the main magnetizing coils connected in series with the primary of a variable mutual inductance M and with a source of 60 cycle alternating current. Y is the yoke and H the coils upon it. These are connected in series with the secondary of the mutual inductance and with a voltmeter V. When the coils B, C, are energized, the voltmeter will indicate a reading; this reading may be changed by changing the mutual inductance M. It will be noted that the current in the primary of the inductance is in the same phase as that in the energizing coils B, C, and hence the voltage in its secondary will be in quadrature with that current. Thus the secondary voltage may be adjusted to such a value as to exactly cancel any voltage in the coils HH which is likewise in quadrature with the exciting current and any remaining voltage which cannot be cancelled by the inductance will be in quadrature with that induced in the mutual inductance and hence in-phase (or 180° out of phase) with the current in BC.

Changing the switch K from the lower to upper contact will cause the voltmeter to measure the total resultant voltage induced in HH, and the in-phase component can be computed by the formula $$V_i = \sqrt{V_R^2 - V_Q^2}$$

where $V_i$, $V_R$, $V_Q$ are the in-phase, resultant, and quadrature voltages respectively.

If the plate being examined is a solid one and if the air-gap is of a suitable length, it is found that the quadrature voltage is many times as great as the in-phase voltage. But if the portion of the plate beneath the yoke contains a lamination the quadrature voltage may drop 50% below its former value, while the in-phase voltage remains as before very small. However, had the air-gap been too small, the quadrature voltage would be very small and the in-phase voltage very large. Furthermore under these circumstances it would be found that both voltages depend so much on small variations in airgap, composition of steel, and cold-worked condition of the latter, that changes due to laminations would be covered up. A number of yokes Y may be used if desired. They should be equally spaced across the width of the area to be examined. The yokes and exciting coils may all be carried by a single frame and moved along a plate being tested or the coils and yokes may be stationary and the plate in motion. Also each yoke Y may have a mate located symmetrically beneath with their coils so connected in series that their voltages are additive.

I now give the simple physical theory which accounts for the above phenomena. In Fig. 3 are shown the relative positions of main plate A and yoke Y. $F_0$ is a line of force of the main magnetic circuit and F a line of force of the independent magnetic circuit through Y, coupled to F by the eddy currents indicated by dots E. In Fig. 4 is shown the same situation more diagrammatically so as to emphasize that the two magnetic circuits $F_0$ and F are independent except for the eddy current coupling represented by ring E. This independence is based on the assumption that the magnetic materials of A and Y have a constant permeability and negligible hysteresis up to the maximum field-strengths involved. This assumption is generally and successfully used in electrical theory, and can be satisfactorily realized in practice. Examples of such independent magnetic circuits are provided by the synchronous motors driving electric clocks where a copper short-circuiting ring around a branch of the magnetic circuit causes the flux in that branch to be partially in quadrature with the other branch. In what follows I assume that the reluctance of the magnetic path through Y is large enough so that only a negligible flux is induced in it due to leakage from the main plate.

Let the flux in the main plate, which links the eddy currents, be $F_0 \sin \omega t$. Let the flux in path Y be $F_1 \sin \omega t + F_2 \cos \omega t$ where $F_2$ is the "quadrature" component, measuring the phase from the epoch established by $F_0 \sin \omega t$. Let the reluctance of path Y be $\rho$ and let the resistance of path E be R. Absolute electromagnetic units are used to simplify calculation. Then the flux in Y is due only to the current I circulating in ring E and is in phase with the latter.

$$F_1 \sin \omega t + F_2 \cos \omega t = \frac{4\pi I}{\rho} \quad\quad (1)$$

But I is due only to the fluxes threading path E and is proportional to the time rate of change of the latter with the sign changed.

$$I = -\frac{1}{R}\frac{d}{dt}(F_0 \sin \omega t + F_1 \sin \omega t + F_2 \cos \omega t)$$

$$= -\frac{1}{R}[(F_0 + F_1)\omega \cos \omega t - F_2 \omega \sin \omega t] \quad (2)$$

Substituting the value of I from Equation 2 in Equation 1 and equating separately the coefficients of the sine and cosine terms, we finally obtain $$F_1 = \frac{-F_0}{1 + \frac{\rho^2 R^2}{16\pi^2 \omega^2}} \quad\quad (3)$$

$$F_2 = \frac{-\rho\frac{RF_0}{4\pi\omega}}{1 + \frac{\rho^2 R^2}{16\pi^2 \omega^2}} \quad\quad (4)$$

$$\frac{F_2}{F_1} = \frac{\rho R}{4\pi\omega} \quad\quad (5)$$

The three equations 3, 4, 5 express the entire essence of the theory of this experiment.

Fig. 5 shows in graphic form the contents of these equations. Here we take the quantity $\rho R/4\pi\omega$ as independent variable and the various ratios $F_1/F_0$, $F_2/F_0$ and $F_2/F_1$ as dependent variables. It will be noted that the reluctance $\rho$ of the magnetic circuit Y and the resistance R of the linked eddy current circuit always occur as a product. The main portion of $\rho$ is due to the air-gap between Y and A. Using a proper value for the air-gap I can make my test sensitive either to R or $\rho$.

The technical application of my invention depends on the fact that a lamination or inclusion of a certain form increases R, the resistance of the eddy current path. In Figs. 6, 7 and 8, are shown broken sections of a plate looking lengthwise of the yokes and the lines of force. Fig. 6 shows a solid section where the eddy currents (shown dotted) have a short path of low resistance. Fig. 7 shows the condition when there is a fairly broad lamination, and the current paths are seen to be long and the resistance high. (One would estimate that such a condition would nearly double the resistance, and experiment proves this to be so.) Fig. 8 shows conditions when there is a vertical crack extending to the surface, and one would expect only a slight increase in resistance. Experiment likewise verifies this.

I have found that a serious lamination is accompanied by a decrease in the quadrature component of from 20% to 50%. By reducing the value of the in-phase component in the manner described, i. e., by working with a value of $\rho R/4\pi\omega$ considerably larger than unity, the in-phase component may sometimes be made so unimportant that it may be neglected. When this occurs the separation of the two components of voltage becomes non-essential, and the voltmeter may be connected directly to the coils on the yoke.

Thus the particular arrangement of apparatus for carrying out my invention will depend on the shape of the article examined and on the nature of the expected defect. For example, a tube may have defects or cracks of either the type shown in Fig. 9, or that shown in Fig. 10. In the first case I would use the apparatus already described, with a multiplicity of yokes located around the circumference or else with means for rotating the pipe under a single yoke. In the type shown in Fig. 10, however, the situation is different and the effective eddy currents should traverse the entire circumference. In this application I should use instead of a yoke a tube-shaped core of non-conducting laminated material with the ends flanged inward to secure the proper air-gap, as in Fig. 11. The voltage coil would be wound in the hollow interior of the core. The voltage obtained in this case would also include that due to the entire main flux as well as that due to the eddy current coupling; but the quadrature component will obey the rules already laid down.

Figure 12:
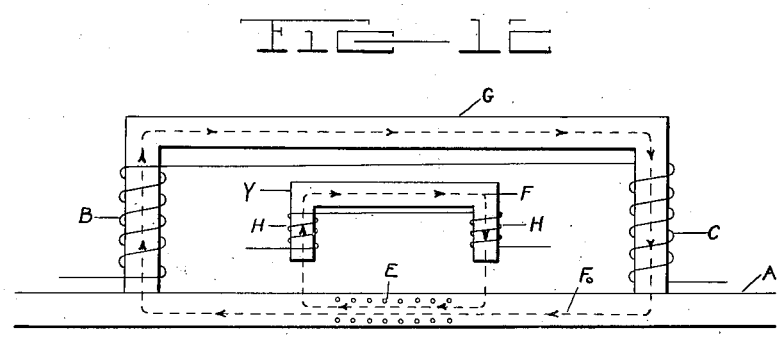
Figs. 12 and 13 are diagrammatic views of two other embodiments of the invention, showing paths of flux therethrough.

A further application of my invention is shown in Fig. 12. In this figure are shown two independent yokes G and Y. Yoke G carries the exciting coils B and C, and through its pole pieces supplies the main flux $F_0$ traversing A, the article under examination. The yoke Y and its coils H perform exactly the same functions as in the methods already described. It is mounted as a single unit with the large yoke G.

Figure 13:
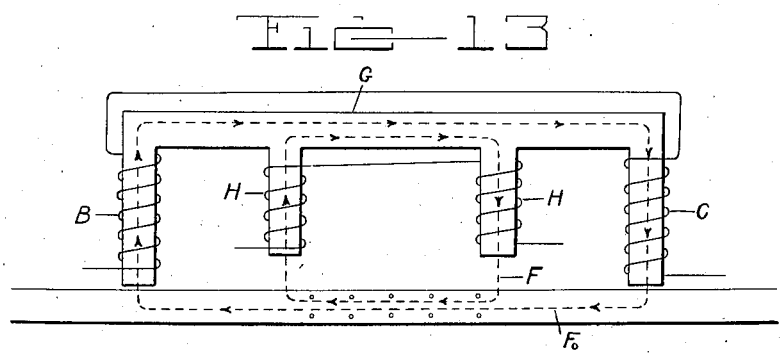

In Fig. 13 I show a still further extension of this idea. In this figure, the two yokes of the previous figure are united into a single yoke G. The exciting flux $F_0$ is generated by the exciting coils B and C; the eddy current flux F traverses a common magnetic circuit with $F_0$ in the portion of the yoke between the center pole-pieces. However, since the yoke is made of laminated material, there is no coupling between the two magnetic circuits except by means of the eddy currents in the main article, as previously described. Both of the units just described are intended for examining local areas or sections of irregular shape such as cannot readily be handled by the method described in the preceding paragraphs.

While the disclosure has been confined to certain specific embodiments, it is to be understood that the invention is not to be restricted thereby but only by the scope and limitations of the following claims.

The invention described herein may be manufactured and/or used by or for the Government of the United States of America for governmental purposes without the payment of any royalties thereon or therefor.

I claim:

1. A method of detecting cracks, flaws or seams in articles made of ferromagnetic materials comprising, magnetizing the article in an alternating field, arranging a magnetic shunt adjacent said article so that the flux in said shunt is coupled with eddy currents generated in said article, associating a coil with said shunt in such a manner that magnetic flux flowing through said shunt will induce an alternating voltage in said coil, separating said induced voltage into two components, one of said components being in phase and one in quadrature with the flux in said article, and varying the coupling between said shunt and said article until said quadrature component is much larger than said in-phase component, the component in quadrature being a measure of the resistance to eddy current flow existing in the article in the region adjacent said shunt and therefore an indicator of flaws existing in that region.

2. A method of detecting flaws, cracks or seams in articles made of ferromagnetic materials comprising, magnetizing the article in an alternating field, arranging a magnetic shunt adjacent said article but separated therefrom by an air gap, in such a manner that the flux in said shunt is coupled with eddy currents generated in said article, associating a coil with said shunt in such a manner that magnetic flux flowing through said shunt will induce an alternating voltage in said coil, separating said induced voltage into two components, one of said components being in phase and one in quadrature with the flux in said article, and regulating said air gap so that said in phase component will remain very small regardless of eddy current flow in said article while said quadrature component will be relatively large and will vary in accordance with resistance to eddy current flow existing in the article in the region adjacent said shunt, thereby being an indicator of flaws existing in that region.

3. A method of detecting flaws, cracks or seams in articles made of ferromagnetic materials comprising, providing an alternative path for lines of force generated by eddy currents in said article, said path including a portion of said article and being comprised in part of an air gap, regulating the size of said air gap to such a value that the lines of force flowing in said path will be very nearly restricted to those due alone to eddy currents in said article in the region adjacent said path, and measuring the amount of flux traversing said path, the amount of said flux being a measure of the resistance offered by said article to eddy current flow therein, in the region adjacent said path.

4. A method of detecting flaws, cracks or seams in articles made of ferromagnetic materials comprising, magnetizing the article in an alternating field, arranging a magnetic shunt adjacent said article but separated therefrom by an air gap, in such a manner that the flux in said shunt is coupled with eddy currents generated in said article, associating a coil with said shunt in such a manner that magnetic flux flowing through said shunt will induce an alternating voltage in said coil, separating the induced voltage in said coil due to the flow of magnetic flux through said shunt into two components, one of said components being in phase and one in quadrature with the flux in said article, regulating said air gap so that said in phase component will remain very small regardless of eddy current flow and of differences of magnetic permeability in said article while said quadrature component will be relatively large and will vary in accordance with resistance to eddy current flow existing in the article in the region adjacent said shunt, thereby being an indicator of flaws existing in that region, and cancelling out by means of an opposing voltage any voltage induced in said coil which is not in quadrature with the flux in said article.

5. Means for detecting cracks, flaws or seams in articles made of ferromagnetic materials comprising, a pair of spaced coils adapted to be placed so as to surround said article and to induce an alternating field therein, a magnetic shunt located adjacent said article and between said coils but separated from said article by an air gap, a coil wound on said magnetic shunt, a transformer, the primary of which is in circuit with said pair of coils and the secondary of which is in circuit with said coil, said air gap being adjustable to a value at which the voltage induced in said coil by the presence of eddy currents in said article in the region adjacent said shunt will have a large component in quadrature with the flux in said article and a small component in phase with said flux, the large component varying with resistance to eddy current flow in that region of the article, and the primary of said transformer being so adjustable as to cancel any voltage induced in said coil which is not in quadrature with the flux in said article.

6. Means for detecting cracks, flaws or seams in articles made of ferromagnetic materials comprising, means for generating an alternating magnetic field in said article, a magnetic shunt located adjacent a portion of said article in which said field is flowing, but separated therefrom by an air gap, a coil wound on said shunt, the size of said air gap being selected at such a value that the voltage induced in said coil by the presence of eddy currents in said article in the region adjacent said shunt will have a large component in quadrature with the flux in said article and a small component in phase therewith, the large component varying with resistance to eddy current flow in that region of the article, and means for inducing in said coil a voltage which will oppose and cancel any voltage otherwise induced therein which is not in quadrature with the flux in said article.

7. Means for detecting cracks, flaws or seams in articles made of ferromagnetic materials comprising, means for generating an alternating magnetic field in said article, means located adjacent a portion of said article in which said field exists and providing an alternative path for flux generated by eddy currents flowing in said portion, said path including a portion of said article and being comprised in part by an air gap, a coil so located with respect to said last named means as to have a voltage induced therein by the passage of flux through said means, the air gap of said path being selected at such a value as to cause the voltage induced in said coil by flux in said path to consist of two components, one of said components being large and in quadrature with the magnetic flux in said article, and the other being small and in phase with said flux, said large component varying with the resistance to eddy current flow in the region of the article adjacent said path forming means, and means for cancelling any component of voltage induced in said coil which is not in quadrature with the flux in said article.

8. Means for detecting cracks, flaws or seams in articles made of ferromagnetic materials comprising, a U-shaped main yoke of magnetic material having each of its legs wound with a coil, means for causing a flow of alternating current through said coils, the extremities of the legs of said yoke being in contact with said article to be tested, whereby an alternating magnetic field will be generated in said article, a pick-up yoke smaller than said main yoke and similar thereto, the legs of said yoke each being wound with a coil, the extremities of the legs of said pick-up yoke being spaced from said article by an airgap, said air gap being selected at such a value that the voltage induced in said coil by the presence of eddy currents in said article in the region adjacent said pick-up coil will have a large component in quadrature with the flux in said article and a small component in phase therewith, the large component varying with resistance to eddy current flow in that region of the article, the coils of said pick-up yoke being in a circuit separate from but inductively coupled to the circuit containing the coils of said main yoke, said coupling being adjustable whereby any voltage induced in the coils of said pick-up yoke not in quadrature with the flux in said article may be cancelled.

9. Means for detecting cracks, flaws or seams in articles made of ferromagnetic materials, comprising a four-legged, comb-shaped yoke made of laminated magnetic material, a first circuit comprising a source of alternating current and a pair of coils, one wound on each of the outer legs of said yoke, a second circuit comprising a pair of coils, one of which is wound on each of the inner legs of said yoke, the inner legs of said yoke being shorter than the outer legs by an amount which when the extremities of said outer legs are placed against the article to be tested will cause a voltage to be induced in said inner legs, said voltage having a large component in quadrature with the flux flowing through said article and a small component in phase therewith, said large component varying in accordance with eddy current flow in the region of said article adjacent said inner legs, and means coupling said circuits together in a manner such that any voltage induced in the coils of said second circuit which is not in quadrature with the flux flowing in said article will be cancelled.

10. Means for detecting cracks, flaws or seams in articles made of ferromagnetic materials comprising a field generating coil surrounding a portion of said article, means supplying said coil with alternating current whereby an alternating field is induced in a portion of said article, a pick-up yoke located adjacent said portion of said article and separated therefrom by an air gap, said pick-up yoke having coils wound thereon and constituting an alternative path for flux traversing said article, the size of said air gap being so selected that the voltage induced in the coils of said pick-up yoke by the presence of eddy currents in said article in the region adjacent said yoke will have a large component in quadrature with the flux in said article and a small component in phase therewith, the large component varying with resistance to eddy current flow in said region.

11. Means for detecting cracks, flaws or seams in articles made of ferromagnetic materials comprising, means for generating an alternating magnetic field in said article, a magnetic shunt located adjacent a portion of said article in which said field is flowing, but separated therefrom by an air gap, and a coil wound on said shunt, the size of said air gap being selected at such a value that the voltage induced in said coil by the presence of eddy currents in said article in the region adjacent said shunt will have a large component in quadrature with the flux in said article and a small component in phase therewith, the large component varying with resistance to eddy current flow in that region of the article.

12. A method of detecting flaws, cracks or seams in articles made of ferromagnetic materials comprising, magnetizing the article in an alternating field, providing an alternative path for lines of force generated by eddy currents in said article, said path including a portion of said article and an air gap as component parts, regulating the component parts of said path until said path is independent of the path followed by lines of force generated in said article by said alternating field, and measuring the amount of flux traversing said independent path, the amount of said flux being a measure of the resistance offered by said article, in the region adjacent said independent path, to the flow of eddy currents therein.

ROBERT H. CANFIELD.